Sept. 19, 1939.　　　　H. HINDEN　　　　2,173,204
CENTRIFUGAL CLUTCH FOR MOTOR CARS
Filed May 8, 1933
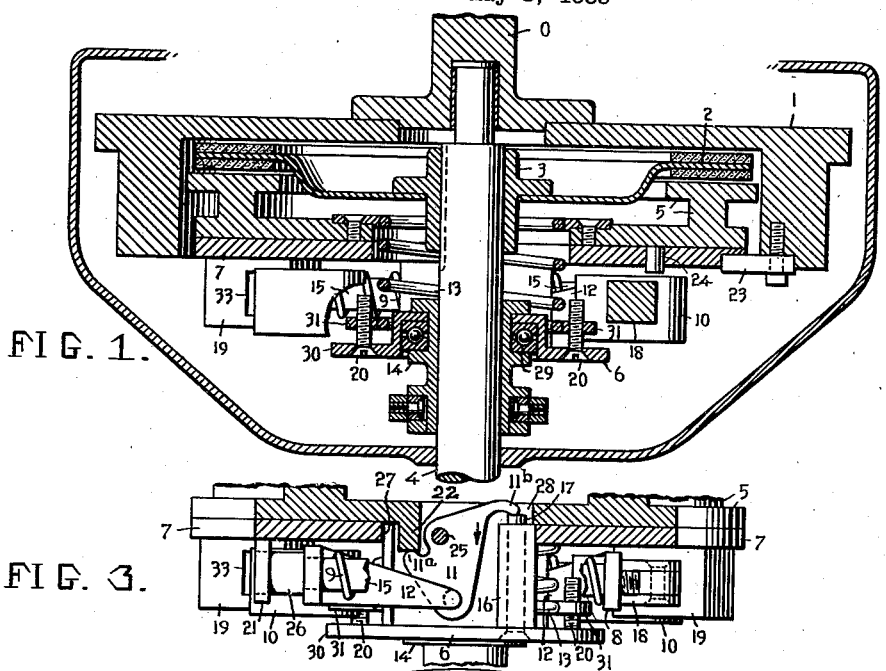
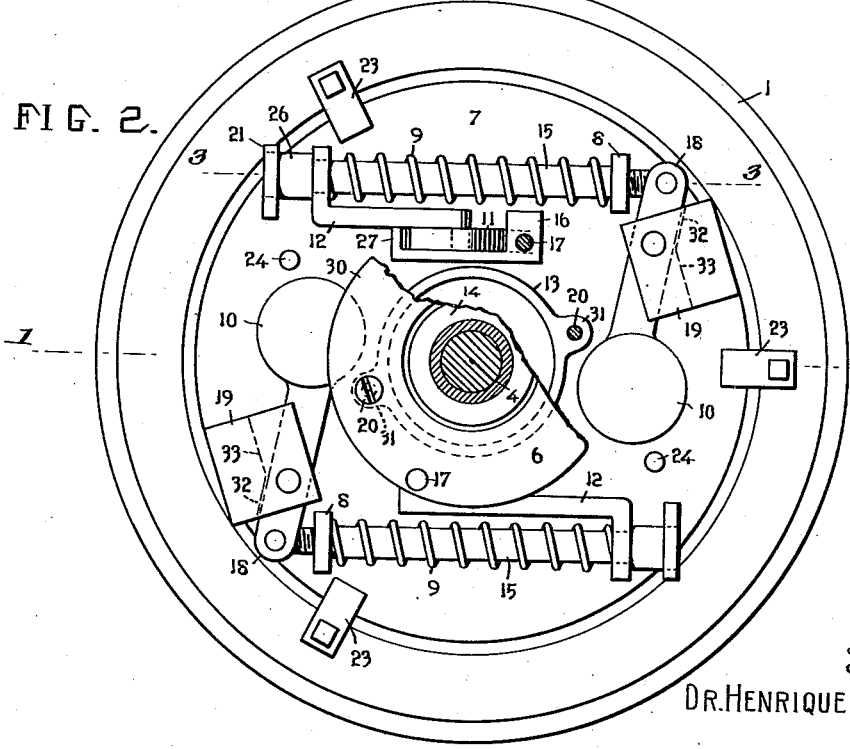
Inventor:
DR. HENRIQUE HINDEN
By Barker & Collings
Attorneys Patented Sept. 19, 1939

2,173,204

UNITED STATES PATENT OFFICE 2,173,204

CENTRIFUGAL CLUTCH FOR MOTOR CARS

Henrique Hinden, Rio de Janeiro, Brazil

Application May 8, 1933, Serial No. 669,974
In Germany May 28, 1932

5 Claims. (Cl. 192—105)

This invention relates to centrifugally operated clutch mechanisms, being particularly devised for use in connection with driving mechanisms employed on motor vehicles of the present day construction, through not limited in its useful applications to such uses.

Its objects are to produce a clutch of this type that is highly efficient, is simple in construction and that may be readily applied to the already constructed power mechanism of an automobile.

Besides possessing many of the common characteristics of centrifugal clutch mechanisms now in use, it has other novel, distinctive and desirable features of construction which will be pointed out in the following specification, and by means of which the driver, upon starting the motor, is not required to manipulate the declutching and speed transmission mechanisms through the ordinary shifting device provided therefor. So long as the motor runs at low speed, say below 350 R. P. M., the motor is automatically and entirely declutched from the running gear, and may thus idle as long as desired.

When it is wished to start the car, and the driver opens the throttle valve, whether suddenly or gradually, thus increasing the speed of the motor above the aforesaid minimum, the clutching parts come into engagement, and the car is started invariably with the full torque of the motor at the lowest possible number of revolutions thereof, say when it attains 900 R. P. M. The start may be effected with the gears in direct drive without necessitating other manipulations, such as gear shifting, or any attention on the part of the driver beyond throttle control. This means that the motor is absolutely prevented from racing, the start is attained smoothly and withut danger of stalling the engine, and the time required for starting, as well as the wear upon the friction discs of the mechanism, are both reduced to a minimum.

Moreover the engine is self-regulating, that is to say means are provided to automatically take care of the wear which necessarily occurs in the friction discs so that the device acts with practically the same efficiency when the discs are worn as when new.

In the accompanying drawing, wherein one form of my invention is illustrated,

Figure 1 is a central horizontal sectional view of the clutch mechanism taken on the line 1, 1 of Figure 2;

Figure 2 is an elevation thereof as seen from the driven shaft side thereof and, Figure 3 is a sectional elevation taken on the line 3, 3 of Figure 2, parts being broken away.

In Figure 1 of the drawing the bounding walls of a chamber in which the clutch is located are represented. This may be taken to indicate a casing in which the clutch is mounted and illustrates the fact that the clutch may be readily located in the clutch casings or chambers of motor cars as now ordinarily constructed, since my improved clutch is adapted to be bodily substituted for clutch mechanisms of existing cars. Referring to the drawing, o designates the motor or driving shaft of the clutch, supported in any usual or approved manner. To this shaft is connected a fly wheel 1 that rotates therewith. 4 indicates the driven shaft which is preferably in axial alignment with the shaft o. To this shaft 4 there is connected, by sleeve or hub 3, the friction clutch element 2, this being preferably in the form of a disc provided on either face and near its periphery with friction pads or wearing surfaces. The parts thus far referred to are common in the art, and in case my invention should be substituted for an already installed clutch mechanism they could remain intact.

The fly wheel 1 is represented as provided on one face, which is herein designated the rear face, with a chamber concentric with the axis of its supporting shaft and in this chamber are located the friction elements of the clutch, the driven shaft element 2 of which is arranged to be brought into direct engagement with the wall of the chamber. Secured to the fly wheel by suitable means, such as indicated at 23, so as to rotate therewith, is a rear or base plate 7. This plate is in the chamber in the fly wheel and its rear face is preferably in a plane approximately coinciding with the rear face of the wheel. Immediately in front of the rear plate 7 is the movable clutch clamping plate 5 constructed to have frictional engagement with the rear working face of the friction disc 2, and to clutch such disc between it and the fly wheel, and, since these two turn together, cause the clutch disc 2 and the driven shaft 4 to turn with them, thus serving to transmit motion directly from the drive shaft o to the driven shaft 4 through these friction-engaging clutching elements. The disc 5 is connected with the rear plate 7 by pins 24 which unite these parts so that they will rotate in synchronism but may be moved longitudinally, relative to each other to a limited extent, in directions parallel with the axis of the shaft.

Pivotally supported in brackets 19 provided therefor on the rear face of the rear plate 7 are centrifugally operated levers 18. There preferably two of these levers, though the number employed is not an essential feature of the present invention; either one, or more than two might be employed, though the showing in the drawing is practical and that which I prefer. Each lever, which is supported so as to rock in planes parallel with the faces of the rotating parts of the clutch, carries at one end, or is shaped to constitute, a weight 10; and when the apparatus is in motion centrifugal force acting on these weights tends to throw them outwardly or away from their axis of revolution, rocking the levers. The centrifugal forces developed by the weights 10 are transmitted and utilized to force the plate 5 into engagement with the disc 2. These centrifugal forces and the motions which they produce are transmitted through yielding power transmitting elements, which act at low speeds of revolutions as rigid connectors and power transmitters, but which, after the determined minimum speed of revolution of parts has been attained and the frictional connecting means between the power shaft and the driven shaft have come into connecting engagement, are adapted to yield, so that while the weights 10 may move still farther outwardly the force with which they hold the friction-engaging surfaces together remains approximately constant.

Pivotally connected with that end of each lever 18 which is opposite the weight 10 is a rod or link 15. This is supported at its free end in a bracket or standard 21 extending from the plate 7. That end of the link which is supported in the standard is preferably enlarged as at 26 and is fitted in the standard 21 so as to slide freely therein as the link is moved by the lever 18. A connecting link 12 unites the rod 15 with a lever 11 located in a recess 27 in the plate 7, to which plate it is connected by a pivot 25. Upon the rod or link 15 near the end that is pivotally united with the lever 18, is a nut 8, united to the link by screw threads, and between this nut and the connecting link 12 is a coil spring 9 surrounding the rod.

The link 12 is preferably of L-shape, the shorter leg thereof being perforated for the passage of the rod 15 and the longer leg being parallel with the rod 15. The short leg of the link 12 bears against the head 26 of the rod 15 against which it is held by the spring 9 which is maintained under a pressure or tension such that the parts will be maintained in the positions indicated in Figure 2, that is with the short leg of the link 12 held close against the head 26 by the spring 9, until a certain minimum speed of revolution of the driving shaft is reached, and the frictional engaging faces of the clutch members have been brought into clutching engagement through movements of the lever or levers 18 and the weight or weights which they carry. After such engagement takes place further movement of the lever 18 and its weight, due to increasing speed of revolution of the driven shaft, causes the rod 15 to move independently of the link 12, which latter is now held in position by the engagement of the friction clutch elements, the spring 9 being thus compressed and put under additional tension. This additional movement of the link 15 continues until the lever 18 is arrested by engagement with the abutment 33 in the standard or link support 19.

The manner in which the link 15 transmits motion from the centrifugally operated lever 18 to the engaging clutch elements will now be set forth, reference being particularly directed to Figures 2 and 3. The lever 11 is formed with two arms located on opposite sides of the pivot 25, these being respectively designated 11ᵃ and 11ᵇ. This lever, as has been stated, is located in a recess 27 formed therefor in the plate 7, and the longer arm 11ᵇ occupies a recess 28 formed in the clutch plate 5. The short arm 11ᵃ bears against a lug or projection 22 carried by the plate 5 and extending into the recess 27, as represented in Figure 3, while the longer arm 11ᵇ bears upon a pin 17, supported so as to be free to slide in a bearing 16 carried by the rear plate 7. The pin 17 is secured to and projects from a plate 6, which I term the declutching plate, that is concentric with the shaft 4, is preferably smaller in diameter than the discs 5 and 7 and is located some distance to the rear of the plate 7. The declutching plate is formed with a central cup-shaped portion forming a chamber in which is located an anti-friction bearing 29, preferably of the ball type, see Fig. 1. Immediately surrounding this chamber and extending from the edge of the rim thereof is an outwardly projecting flange 30 which is parallel with the base or rear plate 7. 13 is a coil spring surrounding the driven shaft 4 and secured at its opposite ends respectively to the declutching plate 6 and the clutch plate 5. The connections between this spring and the declutching plate 6 consist of screws 20 that pass through the flange 30 of the plate and engage with projections 31 carried by the inner portion of the spring and screw threaded to receive the screws 20. The connections between the inner end of the spring and the plate 5 are similar to those which have been described as uniting it with the plate 6. Surrounding the shaft 4 and resting against the ball bearing 29, is a collar 14 arranged to be moved from the usual declutching pedal with which all motor vehicles are now equipped and which it is not deemed necessary to illustrate. This collar I designate the declutching thrust collar.

The spring 13 that unites the declutching plate 6 with the clutch clamping plate 5 is co-axial with the shaft 4 and is of such tension that normally, and when the motor is at rest, it serves to hold the clutch plate 5 in declutching position, that is slightly out of engagement with the friction disc 2. This spring 13, in the combination in which it is represented, has certain advantages in the way of simplicity and compactness of construction as well as effectiveness of operation over other constructions, especially such as employ a multiplicity of springs, which may be used for insuring automatic declutching of the parts. However, the invention in its other features is not limited to the specific spring arrangement I have shown, that is the single coiled spring 13 coaxial with the shaft 4.

The operation of the apparatus which has been described may be now set forth. When the parts are at rest, that is when the motor is not in motion, they occupy positions with the levers 18 resting against abutments 32 formed therefor in the supporting brackets 19, where they are held by the force of the spring 13. Upon the motor being started, its shaft, being now declutched from the driven shaft 4, gradually accelerates until a minimum number of revolutions, which has been determined upon, is attained, say 350 R. P. M. During this period, from start to such minimum number of revolutions, the weights 10 gradually move outwardly or away from the axis of revolution and the rods or links 15 are moved, these operating each as a unit or as would a rigid link, because the force of the springs is such that they do not yield until the friction clutch-engaging surfaces come into intimate and operative engagement. As the weights begin to move outwardly and the rods or links 15 are moved the connecting links 12 are also moved, and they in turn impart rocking movements to the levers 11, in the direction of the arrow in Figure 3. These movements of the levers cause the short arms 11ª thereof to bear upon the lugs 22 of the plate 5 which is thus moved in a direction toward the friction surfaces of the clutch disc 2. At the same time the longer arms 11ᵇ of such levers engage with the pins 17 carried by the declutching plate 6 and move these pins and the plate in a direction opposite to that in which the arms 11ª move the plate 5. Thus the plates 5 and 6 are moved apart and the spring 13 which is connected to these plates respectively is extended or stretched and put under a tension, the tendency of which is to draw the clutch plate 5 backward or away from clutching engagement with the driven clutch disc 2. It will be seen from this that the spring 13 is made to serve as an automatic declutching element, for as soon as the motor decelerates and comes down below 350 R. P. M., the parts will approach the position shown in Figure 3, the spring 13 drawing the plates 5 and 6 towards each other as the levers 11 move and allow such plates thus to approach.

After the motor has attained a speed beyond a determined number of revolutions, such as 900 R. P. M., the springs 9 are put under compression, and this compression increases until a certain maximum speed is attained as for instance 1000 R. P. M. when the levers 18 come into engagement with abutments 33 on the brackets 19, after which if the engine continues to accelerate the pressure upon the clutch parts remains constant, as determined by the springs 9. These springs, as has been stated, are adjustable by means of nuts 8 so that the desired regulation of the parts may be attained.

The spring 13 is likewise adjustable by means of the screws 20.

At any time the driving gearing, which is operated directly from the shaft 4, may be declutched from the motor at the will of the operator by simply moving the declutching thrust collar 14 forwardly. This action moves the collar 6, which, if continued far enough, causes the pins 17 carried by the collar 6 to act upon the long arms of the levers 11 and thus, positively relieving clutch plate 5 from pressure from the centrifugally acted means, allows the friction surfaces of the clutch to disengage.

The clutch mechanism which I have described is of simple construction, is of small dimensions and of a nature that permits it to be easily substituted for clutching mechanisms already installed on motor vehicles.

As will be understood, the friction pads or wearing surfaces carried by the driven disc 2 will wear in use, and this requires on the part of the driver of the vehicle more effort and a greater movement of the pedal in declutching when the parts are worn than when they are new. However, to reduce this difference of movement required to the greatest possible degree the spring or springs 9 are made as long as possible and they are arranged as shown, that is so that they yield in a plane that is transverse or rectangular to the motor shaft. This and the arranging of the single, release spring 13 co-axial with the said shaft are important features of the present invention, making for simplicity of construction and ease and certainty of operation through the entire life of the clutch.

Means for adjusting the springs 9 and 13 have been described and are illustrated. It should be understood that the adjustments thus provided for are made when the parts are being set up or assembled and that once having been correctly made there is no further necessity for change or regulation during the complete life of the friction discs.

The lever 11 that serves to move apart the clamping plate 5 and the rear plate 7 is preferably of double bell crank lever form or construction, such as shown, and is supported upon a pivot, the axis of which is at right angles to the axis of the driving and driven shafts. This construction and method of mounting enables this part of the apparatus to be of small size and arranged with reference to the other parts well within the space limits in the apparatus as a whole.

The centrifugally operated mechanism, which has been described, mounted to revolve with the driving shaft and base plate 7, and consisting of the centrifugal weighted lever 18, the links 15 and 12, the spring 9, and the lever 11, may be termed a conversion unit that operates to move the pressure plate into engagement with the friction surface of the driven member, utilizing the centrifugal force engendered by the rotation of the weighted lever and translating it into a controlled lateral pressure which is delivered to the clamping plate 5. The spring 9, a part of said conversion unit, is under compression when the parts of the unit are assembled and mounted and is wholly within the compression unit, that is it has supporting and mounting connections with no other part of the apparatus; the arrangement being such, as hereinbefore pointed out, that the conversion unit operates as a rigid connection until a predetermined speed of revolution of the parts has been attained, and thereafter, as speed increases, acts yieldingly due to the compression of the spring.

Having described my invention what I claim is:

1. In a centrifugal clutch, the combination, with a driving shaft, a fly wheel carried thereby, a driven shaft, and a friction disc carried by the driven shaft, of a friction clamping plate turning with the fly wheel and movable to clamp the friction disc between it and the fly wheel, a centrifugally operated lever rotating with the clamping plate, means connected with and operated by the centrifugal lever for moving the clutch clamping plate, a declutching plate adapted to be operated from a pedal, a single, coil, release spring surrounding the driven shaft between the clutch clamping plate and the declutching plate and means for adjusting the tension of the release spring.

2. In a centrifugal clutch, the combination, with a driving shaft, a fly wheel carried thereby, a driven shaft and a friction disc carried by the latter, of a clamping plate turning with the fly wheel and movable to clamp the friction disc between itself and the fly wheel, a rear plate rotating with the clutch plate but free therefrom to permit the friction disc to move toward and from the rear plate to a limited extent, a declutching plate co-axial with the driven shaft and arranged to be moved by a pedal, a single, coil, release spring connected at its opposite ends respectively with the clutching plate and the declutching plate, means whereby the said spring may be adjusted as to its length to vary the tension thereof, a centrifugal lever pivotally supported on the rear plate, a lever of double bell crank form pivotally supported by the rear plate and having opposite arms arranged to operate respectively the clamping plate and the declutching plate to move them in opposite directions and apart when the said lever is turned in one direction and a connection between the centrifugally operated lever and the double bell crank lever arranged when the centrifugal lever is moved outwardly to move the said bell crank lever to force the clutching and declutching plates apart, stretching the spring that connects them.

3. In a clutch, the combination with driving and driven members of a plurality of centrifugally operated conversion units for pressing the driven member against the driving member, said conversion units comprising a plurality of separate parts normally held in predetermined relation to each other by means of compressed springs contained wholly within said units, and means for disengaging the driving and driven members, comprising a pedal-operated lever acting directly upon a part only of said conversion units to overcome the centrifugal force of some but not all of the parts of the conversion units.

4. In a centrifugal clutch, the combination with a driving shaft, a flywheel carried thereby, a driven shaft, and a friction disc carried by the latter, of a clamping plate turning with the flywheel and movable to clamp said friction disc between itself and said flywheel to unite the two shafts; a centrifugally operable member rotating with said clamping plate; a lever acting on the clamping plate to move it toward said friction disc; a connection between said lever and said centrifugally operable member, including a spring tensioned to cause the connection to operate as a rigid connection until a determined speed of rotation has been attained, said spring thereafter yielding as the speed increases; and a release spring arranged co-axially of the driven shaft and acting upon said clamping plate.

5. In a centrifugal clutch, the combination with a driving shaft, a flywheel carried thereby, a driven shaft, and a friction disc carried by the latter, of a clamping plate turning with said flywheel and movable to clamp said friction disc against the flywheel to unite the two shafts; a centrifugally operable member rotating with said clamping plate; a lever acting on the clamping plate to move it toward said friction disc; a rod pivotally connected to said centrifugally operable member, and arranged to be moved longitudinally thereby; a link connecting said rod and lever, the connection between the rod and the link being arranged to provide for movement of the rod relative to the link; and a preloaded spring surrounding the rod with its end bearing against the link, through which the movements of the centrifugally operable member are communicated to the link.

HENRIQUE HINDEN.